United States Patent [19]

Boddicker

[11] Patent Number: 4,468,534
[45] Date of Patent: Aug. 28, 1984

[54] METHOD AND DEVICE FOR CUTTING GLASS

[76] Inventor: Franc W. Boddicker, 444 Girard St., #102, Gaithersburg, Md. 20877

[21] Appl. No.: 430,614

[22] Filed: Sep. 30, 1982

[51] Int. Cl.³ .............................................. B23K 27/00
[52] U.S. Cl. .................. 219/121 LG; 65/112; 219/121 LN; 219/121 LY
[58] Field of Search .................. 219/121 LG, 121 LN, 219/121 LY; 65/104, 105, 112, 95, 97

[56] References Cited

U.S. PATENT DOCUMENTS

| | | | |
|---|---|---|---|
| 1,785,457 | 12/1930 | Rowley et al. ........................... | 65/97 |
| 3,453,097 | 7/1969 | Hafner ....................... | 219/121 LG X |
| 3,885,943 | 5/1975 | Chui ................................... | 65/112 X |
| 3,930,825 | 1/1976 | Chui ................................... | 65/105 X |
| 3,932,726 | 1/1976 | Verheyen et al. ....... | 219/121 LN X |
| 3,935,419 | 1/1976 | Lambert et al. .............. | 219/121 LN |

*Primary Examiner*—C. L. Albritton
*Attorney, Agent, or Firm*—James J. Brown

[57] ABSTRACT

A method and device is described for cutting a stationary sheet of glass such as tempered glass using a single, moving laser beam which impinges the glass at right angles to produce a clean cut with minimum thermal shock. Pre-heating and post-cooling means can also be employed along with a tiltable support structure.

4 Claims, 3 Drawing Figures

METHOD AND DEVICE FOR CUTTING GLASS

STATEMENT OF THE INVENTION

The present invention is directed to a device and method for cutting sheets of glass using a moving single laser beam. More especially, the invention is particularly directed to a system for cutting a sheet of tempered glass which is held stationary using a laser beam which traverses the plane of the glass perpendicular to the path of the intended cut and which may be preceded by a pre-heater and followed by rapid cooling means.

BACKGROUND OF THE INVENTION

It is known in the art to cut glass using a laser beam. For example, U.S. Pat. No. 3,930,825 to Chui describes cutting a molten glass ribbon using a laser beam while U.S. Pat. No. 3,453,097 to Hafner describes cutting a sheet of glass using several stationary laser beams which impact the glass at acute angles to produce a beveled edge.

The cutting of sheets of tempered glass however presents certain problems not found in the technology applied to the cutting of ordinary sheets of glass. Tempered glass while possessing greater strength in some respects than ordinary glass also has a greater tendency to fracture and shutter either from mechanical or thermal shock. Further, the application of heat to tempered glass may result in actually removing the temper from the glass in the localized area of heating. Accordingly, technologies which have found application in the treatment of ordinary glass have frequently not been useful in the treatment of tempered glass sheets.

It is therefore one object of the present invention to provide a method and apparatus for permitting the rapid and efficient cutting of sheets of tempered glass.

It is a further object of the present invention to provide a method and apparatus for cutting tempered glass using a moving laser beam whereby the temper of the glass is retained after the cutting operation.

Still a further object of the present invention is to provide a method and apparatus for cutting tempered glass which avoids the problem of shattering of the glass either from mechanical or thermal shock.

SUMMARY OF THE INVENTION

The above and other objects of the present invention are achieved by providing a system for cutting a glass sheet whereby the sheet of glass rests upon a planar support which can be tilted from an almost vertical position to a horizontal position and held stationary for cutting with a moving laser beam which projects downward from a traverse arm to impinge on the glass at right angles. The laser device itself is of conventional design and of sufficient intensity and appropriate wave length to produce a localized melt of the tempered plate glass sheet as it traverses the sheet along the desired path of the cut. The traverse arm from which the laser is suspended is mounted to ride above the plane of the support table and extends completely across the width of the table in parallel to two opposing sides of the table. The ends of the traverse arm are mounted in tracks along the two opposing edges of the table so that the traverse arm can move the full length of the table. Conveniently, motorized means are provided for causing movement of the traverse arm across the length of the table. Similarly, the traverse arm itself is provided with a suitable track to permit the laser housing to move up and down its full length. Again, it is convenient to provide a suitable motorized mechanism for moving the laser up and down the length of the horizontally disposed traverse arm. In this manner, the laser can be controlled to automatically transcribe a particular path for cutting the glass. It is also useful to provide on either side of the laser focusing mechanism appropriate means for pre-heating the intended path of the cut to a temperature below the melting point of the glass to reduce thermal shock and additional means on the other side of the laser beam for cooling the area of the cut quickly to a temperature below ambient in order to maintain the temper in the glass. In order to permit the laser to cut in either direction the entire laser housing including the pre-heat and post cool means can conveniently be pivotally mounted to allow use in either direction and provided with appropriate switching means The system of the present invention will however be more fully appreciated by having reference to the accompanying drawings which describe a preferred embodiment of the present invention.

Figure 1:
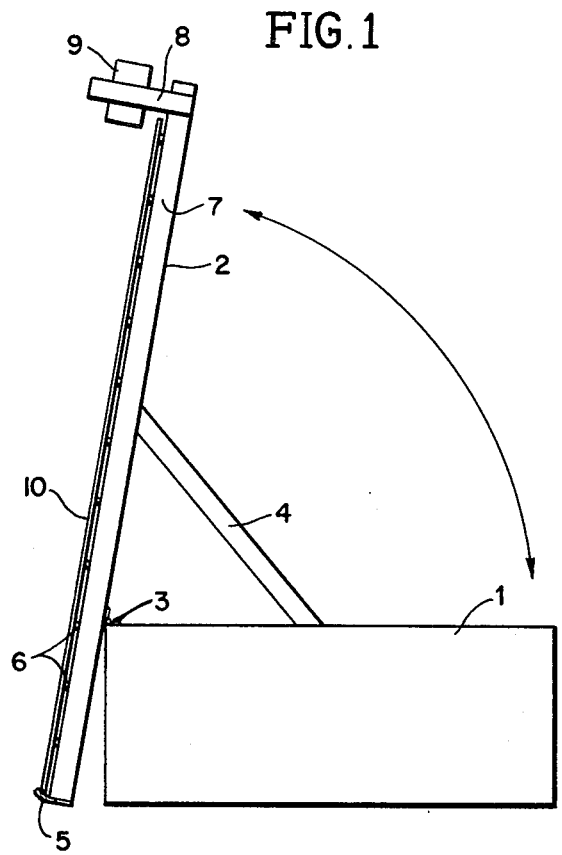
FIG. 1 is a side view illustrating the tilted support table and laser unit in a nearly vertical position.

Directing attention to FIG. 1, a table base 1 is shown having a tiltable top 2 pivotally mounted at 3 so that the support top can be inclined to an almost vertical position as shown in the drawing or returned by means of an arm 4 which may be mechanically or hydraulically operated to a horizontal position in which the top rests upon the table base 1. A lower support edge 5 is provided at the lower end of the inclined top to support the sheet of glass when the support top is in the inclined position. Casters 6 are provided along the surface of the tiltable top to support the plate of glass to be cut is resting flat in a horizontal position. A traverse arm 11 is provided which engages tracks 7 on either side of the top. The traverse arm is further provided with an upright portion 8 and extends across the full width of the top 2 and is adapted to be moved along the tracks 7 the full length of the top. Conveniently, this is done by a suitable power mechanism such as electric motors, pulleys or a rack and pinion drive. The laser mechanism 9 is suspended from the traverse arm 11 and is itself adapted to be moved the length of the traverse arm 11 so that the entire surface of the glass plate 10 resting on the table top 2 can be covered by the laser beam projecting vertically downward from the unit 9. As with the traverse arm 11, the laser mechanism 9 is mounted to be mechanically moved along the traverse arm. This may be done by means of small electric motors, pulleys or similar mechanisms.

Figure 2:
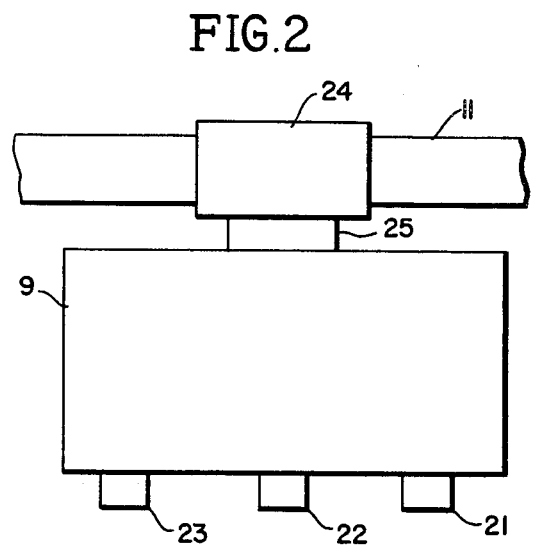
FIG. 2 is a side view of the laser unit housing suspended from the radial arm.

Directing attention to FIG. 2 of the drawings, the radial arm 11 is shown with the laser housing 9 suspended by means of a motorized pivot 25 from the laser guide motor 24. The laser beam itself is focused on the glass in a narrow pencil beam to provide a discrete, sharply defined cut by means of the focusing device 22. A preheater 23 is provided on one side of the laser focal device while a cooler 21 is provided on the other side. The motorized pivot 25 permits the laser mechanism to be reversed so that the cutting of the glass can be accomplished in either direction.

Figure 3:
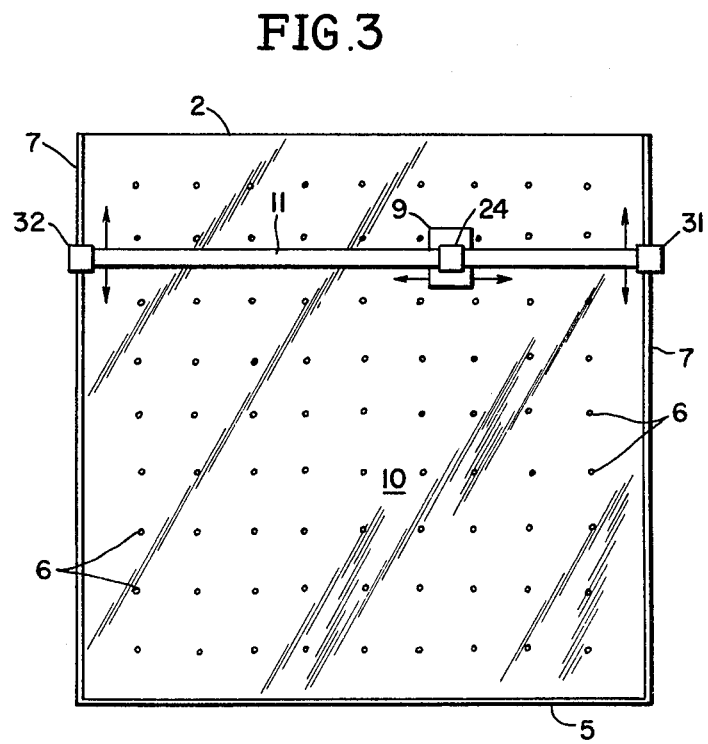
FIG. 3 is a top view looking downward on the horizontally aligned tilt table top with the radial arm and laser unit positioned over the table.

Looking at FIG. 3, the table top 2 is shown in a horizontal position mounted on the table base which is not visible in the drawings. The transparent plate of tempered glass 10 rests on the numerous caster elements 6 present on the top of the table support. The traverse arm 11 is seen extending from opposite sides of the table top and is provided with a pair of guide motors 31 and 32 which propel it along the tracks 7 mounted on the respective opposite sides of the support table but not shown. The laser housing 9 is suspended from the radial arm and moves in either direction along the radial arm by means of guide motor 24. The bottom edge 5 of the support top 2 is provided so that the glass is sufficiently supported and maintained in position when the top is inclined to a nearly vertical position. It will be appreciated that the tilt mechanism employed in the present invention is advantageous in handling the heavy sheets of tempered plate glass which are conveniently cut by the laser mechanism of the present invention. Using this support means the glass can be positioned on the inclined support top and then lowered to the horizontal cutting position without difficulty.

It will be further be seen that any direction of cut can be made by the single laser beam of the present invention since the beam is so mounted as to traverse any path across the entire surface of the support table. By suitable synchronization of the movement of the traverse arm 11 and the laser housing 9 curves or angular cuts can also be accomplished. The laser beam by producing a thin coherent beam of intense energy produces a clean cut through the tempered glass without producing ragged edges or encountering the hazard of shattering which frequently occurs when cuts are made mechanically in tempered glass. Further, by providing a pre-heating means to immediately proceed the laser beam along the path of the intended cut, the potential for thermal shock is diminished. This pre-heating can be provided by means of a blast of hot gas, flame, or other sufficiently high temperature technique but should avoid melting or actual softening of the glass. Similarly, the original temper of the glass can quickly be restored by providing a super cooling means directly following the laser cut. Such a super cooling means might be for example accomplished by way of a stream of cold liquified gas such as freon, nitrogen or carbon dioxide sufficient to quickly drop the temperature at the locus of the cut quickly below ambient and restore the temper.

It will of course be apparent to those of ordinary skill in the art that various modifications of the present invention can be carried out without departing from the scope thereof. It will further be apparent to those of ordinary skill in the art that the present can find other uses such as in the cutting of materials other than tempered glass.

What is claimed is:

1. A method of cutting a sheet of tempered plate glass which comprises inclining said glass sheet to a generally horizontal, stationary position and continuously directing a single laser beam in a predetermined path perpendicular to and along a path across the glass sheet, said laser beam being of appropriate wavelength and intensity to produce a localized melt through the glass substantially along the path of contact therewith thereby cutting the glass along said path.

2. The method of claim 1 wherein said laser beam is preceded by means for preheating said path to a temperature below the melting point of the glass and followed by means for quick cooling the edges of the cut to below ambient temperature.

3. A device for cutting a sheet of tempered plate glass comprising frame means for maintaining said glass sheet in a stationary position said frame means being pivotally mounted to move the plane of said glass sheet from a near vertical to a horizontal position and means for directing a single laser beam perpendicular to said glass and in a continuous path across the surface thereof to cut said glass, said laser means being movably mounted on a pivotally mounted arm and adapted to move horizontal to the plane of the glass.

4. The device of claim 3 which includes means for pre-heating said path of the cut preceding said laser beam and means for quick cooling the edges of the cut subsequent to said laser beam.

* * * * *